United States Patent
Milstein et al.

(10) Patent No.: US 9,621,726 B2
(45) Date of Patent: Apr. 11, 2017

(54) COMPUTER-IMPLEMENTED SYSTEM AND METHOD FOR DETECTING EVENTS FOR USE IN AN AUTOMATED CALL CENTER ENVIRONMENT

(71) Applicant: Intellisist, Inc., Seattle, WA (US)

(72) Inventors: David Milstein, Redmond, WA (US); Gilad Odinak, Bellevue, WA (US); Howard M. Lee, Seattle, WA (US)

(73) Assignee: Intellisist, Inc., Seattle, WA (US)

( * ) Notice: Subject to any disclaimer, the term of this patent is extended or adjusted under 35 U.S.C. 154(b) by 0 days.

(21) Appl. No.: 14/667,549

(22) Filed: Mar. 24, 2015

(65) Prior Publication Data
US 2015/0281449 A1    Oct. 1, 2015

Related U.S. Application Data

(60) Provisional application No. 61/970,283, filed on Mar. 25, 2014.

(51) Int. Cl.
| | |
|---|---|
| *H04M 3/00* | (2006.01) |
| *H04M 3/51* | (2006.01) |
| *H04M 3/487* | (2006.01) |
| *H04M 3/42* | (2006.01) |
| *H04M 3/523* | (2006.01) |
| *G06F 17/30* | (2006.01) |

(52) U.S. Cl.
CPC ..... *H04M 3/5183* (2013.01); *H04M 3/42382* (2013.01); *H04M 3/4872* (2013.01); *H04M 3/51* (2013.01); *H04M 3/5232* (2013.01); *G06F 17/30705* (2013.01); *G06F 17/30861* (2013.01); *H04M 2203/556* (2013.01); *H04M 2203/655* (2013.01)

(58) Field of Classification Search
CPC .................................................... H04M 3/5183
USPC ......... 379/265.01–265.1, 266.01–266.1, 309
See application file for complete search history.

(56) References Cited

U.S. PATENT DOCUMENTS

| | | | |
|---|---|---|---|
| 6,895,083 B1* | 5/2005 | Bers et al. ................. | 379/88.01 |
| 2007/0179953 A1* | 8/2007 | Mahoney et al. ................. | 707/9 |
| 2010/0027778 A1* | 2/2010 | Kumar et al. ........... | 379/265.09 |
| 2010/0246797 A1* | 9/2010 | Chavez et al. ........... | 379/265.02 |
| 2010/0293560 A1* | 11/2010 | Bland et al. ................. | 719/328 |
| 2012/0016948 A1* | 1/2012 | Sinha ........................... | 709/207 |
| 2012/0195421 A1* | 8/2012 | Cutajar ..................... | 379/265.02 |
| 2013/0179440 A1* | 7/2013 | Gordon ........................ | 707/731 |
| 2013/0212192 A1* | 8/2013 | Yerli ............................ | 709/206 |

(Continued)

*Primary Examiner* — William Deane, Jr.
(74) *Attorney, Agent, or Firm* — Patrick J. S. Inouye; Leonid Kisselev; Krista A. Wittman

(57) ABSTRACT

A computer-implemented system and method for detecting events for use in an automated call center environment are provided. A plurality of messages is monitored by a call center. Those messages sharing one or more keywords representative of one or more potential events are identified. The one or more potential events are detected based on the shared keywords. At least one of the potential events is identified as an event based on the number of messages that share the keywords representative of that potential event. Metadata regarding the event is extracted from the messages sharing the keywords representative of the event. A message regarding the event that includes the extracted metadata is generated. The generated message from the call center is provided to at least one user related to the event.

20 Claims, 4 Drawing Sheets

(56) References Cited

U.S. PATENT DOCUMENTS

| | | | |
|---|---|---|---|
| 2013/0232159 A1* | 9/2013 | Daya et al. | 707/758 |
| 2013/0276513 A1* | 10/2013 | Sharma et al. | 73/23.35 |
| 2014/0059126 A1 | 2/2014 | Klemm et al. | |
| 2015/0161216 A1* | 6/2015 | Skiba et al. | 707/603 |
| 2015/0170153 A1* | 6/2015 | Sloan et al. | 705/304 |

* cited by examiner

COMPUTER-IMPLEMENTED SYSTEM AND METHOD FOR DETECTING EVENTS FOR USE IN AN AUTOMATED CALL CENTER ENVIRONMENT

CROSS-REFERENCE TO RELATED APPLICATION

This non-provisional patent application claims priority under 35 U.S.C. §119(e) to U.S. Provisional Patent application, Ser. No. 61/970,283, filed Mar. 25, 2014, the disclosure of which is incorporated by reference.

FIELD

The present invention relates in general to call center communications and, in particular, to a computer-implemented system and method for detecting events for use in an automated call center environment.

BACKGROUND

Customer call centers, or simply, "call centers," are often the first point of contact for customers seeking direct assistance from manufacturers and service vendors. Call centers provide customer support and problem resolution and are reachable by telephone, including data network-based telephone services, such as Voice-Over-Internet (VoIP), or via Web applications that allows customers to make calls or contact the call centers through chat, e-mail, or other text-based communication techniques.

Agents of a call center are trained to assist customers with particular needs. These agents are generally not aware of ongoing events that the customers are affected by, interested in, or that in some other way relate to the customers unless the customers notify the agents of the events. With myriads of potentially notable events happening every day, ranging from elections to thunderstorms to an opening of local film festivals, conventional call centers fail to track the events, losing the opportunity to decrease call times by anticipating events that are relevant to a reason for a customer's call. As a result, when multiple customers contact a call center because of the same event, multiple call center agents must find out the reason for each customer's communication and address the questions and concerns of each customer one at a time. As the number of customers contacting the call center because of the same event increases, the efficiency of the call center decreases as the agents must repetitively spend time addressing identical concerns of a multitude of customers. The efficiency further decreases as agents who have not been previously exposed to customers calling about an event must take time to learn about the customers' concerns, the same concerns that were previously addressed by other agents for other customers who called about the event.

Despite these problems, conventional call centers tend to gather information about events relating to a customer only after the customer contacts the call center. For example, such call centers may ask the customer to input information by choosing options from a presented menu, with a live agent collecting additional information if necessary. This approach ignores information regarding the events related to the customers that is available from other sources. For example, social media, web pages that allow posting of user-generated content, often has information regarding events directly from the people involved in these events. With the widespread use of mobile devices that allow almost-instantaneous Internet access, user-generated information regarding a particular event often becomes available in social media minutes after the events occurs. Despite the availability of this information, the information generally remains unknown to call centers.

Accordingly, there is a need for a system and method that allow a call center to detect events related to the call center's customers or other users associated with the call center before the users contact the call center, and to improve the call center's efficiency and increase customer satisfaction using this knowledge.

SUMMARY

A call center can be notified of ongoing events relating to the call center's customers by searching monitored messages. A computer-implemented system and method for detecting events for use in an automated call center environment are provided. A plurality of messages is monitored by a call center. Those messages sharing one or more keywords representative of one or more potential events are identified. The one or more potential events are detected based on the shared keywords. At least one of the potential events is identified as an event based on the number of messages that share the keywords representative of that potential event. Metadata regarding the event is extracted from the messages sharing the keywords representative of the event. A message regarding the event comprising the extracted metadata is generated. The generated message from the call center is provided to at least one user related to the event.

Still other embodiments will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Conventionally, call centers collect and address customer concerns on an individual basis. Thus, multiple agents may look up or address the same concerns for different users, which is an inefficient use of the agents' time. Addressing user concerns on a group basis would allow the call center to decrease call times and increase overall efficiency.

Figure 1:
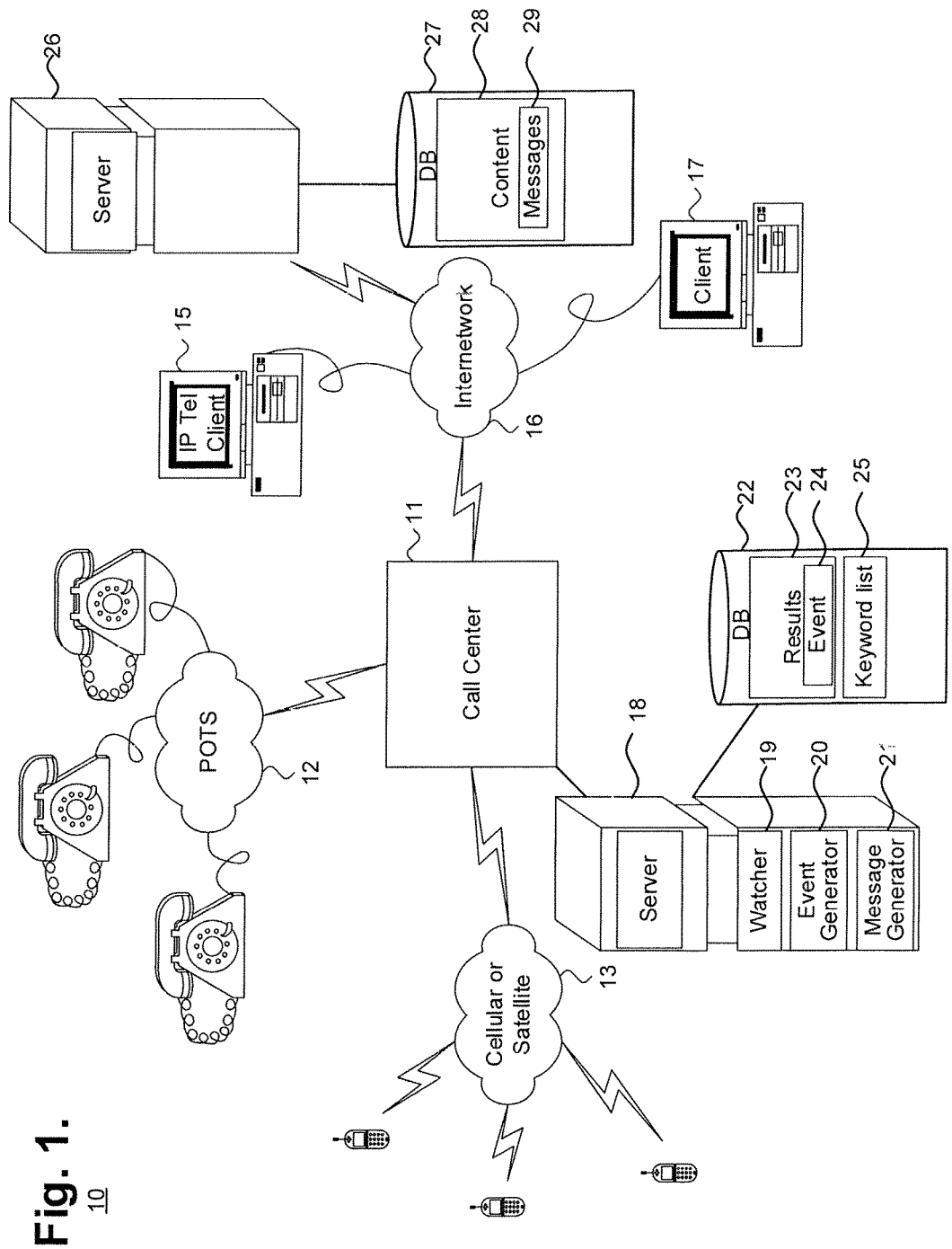
FIG. 1 is a block diagram showing an automated call center environment for detecting events related to users associated with the call center, in accordance with one embodiment.

A call center that can detect events related to their customers or other users associated with the call center before the users contact the call center can improve the level of the call center's services. FIG. 1 is a block diagram showing an automated call center environment 10 that can detect events related to groups of users associated with the call center, in accordance with one embodiment. By way of example, a multiplicity of customers or other users associated with an automated call center 11 can contact the call center 11 through various ways, such as through voice communication. The ways to use voice communication include Plain Old Telephone Service (POTS) 12, cellular and satellite telephones 13, and Internet telephony (IPTel) 15, including Voice over IP (VoIP) technology that can be implemented through a connection to an internetwork 16, such as the internet. Other forms of telephony and voice-based communications can be used, as would be recognized by one skilled in the art. Users can also call to or interface with the automated call center 11 through other data transmission techniques, including through the internetwork 16, using conventional network clients 17. While the client 17 is shown as a desktop computer, other types of devices can be used, including mobile devices such as smartphones and tablets. The data can be transmitted via text messages, emails, or chatrooms. In a further embodiment, the data transmitted can include videos. Other ways to interface with the automated call center 11 are possible.

The automated call center 11 provides a single source of support and problem resolution for customers seeking direct assistance from manufacturers and service vendors, although automated call centers 11 can also be used in other areas of commerce. Although the automated call center 11 is shown as a single point within the automated call center operation environment 10, the automated call center 11 could include one or more logically interconnected but physically separate, including geographically removed, operations, which provide a logically unified automated call center 11.

The automated call center 11 further includes at least one server 18 that is capable of monitoring content 28, such as messages 29. In one embodiment, the content 28 can include social media content maintained by one or more third party servers 26 in one or more databases 27, with the server 18 performing the monitoring using the connection to the internetwork 16, accessing the content 28 from one or more third-party servers 26 connected to one or more databases 27 that store the content 28. Social media includes web pages that allow users to post user-generated content, such as messages 29, images, and videos. Examples of social media can include social networks, such as Facebook®, blogging and microblogging sites such as Twitter®, chatrooms, online games such as World of Warcraft® that allow player communication, forums, video and image sharing sites. Social media can also include any other web pages allowing users to post user-generated content. Other types of content 28 can be monitored by the server 18, such as recordings of voice conversations and text messages 29 that are not publicly available, such as e-mails. Other ways for the server 18 to obtain content 28 are possible. In one embodiment, the content 28 is downloaded to at least one database 22 connected to the server 18 prior to undergoing further processing as described below beginning with reference to FIG. 2. In a further embodiment, the content 28 is accessed directly from the third-party server.

The server 18 can include components conventionally found in general purpose programmable computing devices, such as a central processing unit, memory, input/output ports, network interfaces, and non-volatile storage, although other components are possible. The server 18 is configured to execute modules, including a watcher 19 that monitors the content; an event generator 20 that detects events based on the monitored content; and a message generator 21 that generates a message regarding the detected event, and delivers the message to users associated with the call center 11, as further described below beginning with reference to FIG. 2. Other modules are possible.

The modules can be implemented as a computer program or a procedure written as source code in a conventional programming language and presented for execution by the central processing unit as object or byte code or written as interpreted source code in a conventional interpreted programming language interpreted by a language interpreter executed by the central processing unit as object, byte, or interpreted code. Alternatively, the modules could also be implemented in hardware, either as integrated circuitry or burned into read-only memory components, and the server 18 can act as a specialized computer. For instance, when the modules are implemented as hardware, that particular hardware is specialized to perform the content monitoring, event detection, and message delivery and other computers cannot be used. Additionally, when the modules are burned into read-only memory components, the server 18 storing the read-only memory becomes specialized to perform the monitoring, detection, and delivery that other computers cannot. Other types of specialized computers on which the modules could be implemented are also possible. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Figure 2:
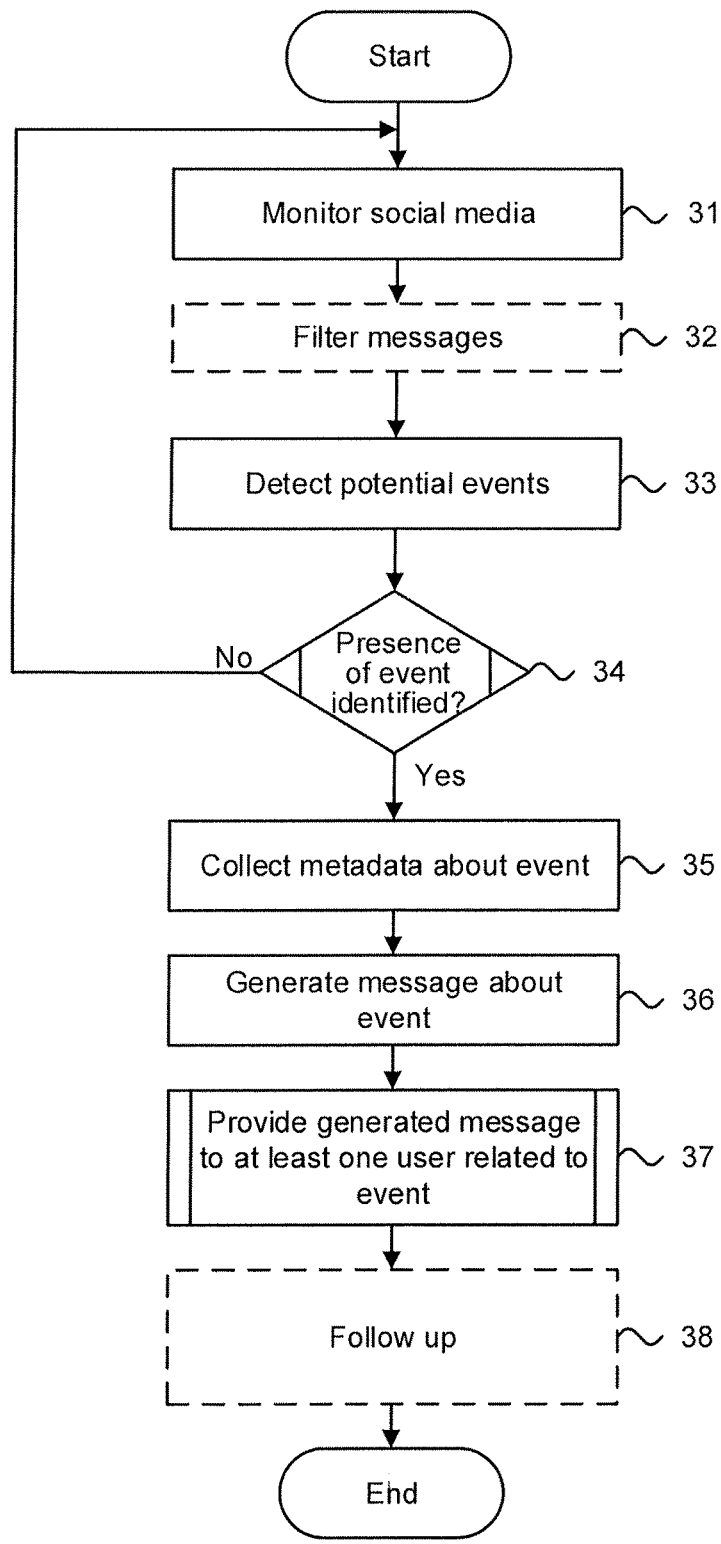
FIG. 2 is a flow diagram showing a computer-implemented method for detecting events for use in the automated call center environment, in accordance with one embodiment.

As described above, and as further described below beginning with reference to FIG. 2, the server 18 monitors content, such as social media messages 29, and identifies recent events 24 that relate to particular users, which can include the call center's customers or other users associated with the call center 11. An event 24 can include any occurrence that happens at a point of time or over a period of time, which relates to the users associated with the call center 11. For example, an event 24 can be a hurricane that causes a power outage for customers of a power company serviced by the call center 11. An event 24 can also be directly unrelated to the products and services whose manufacturers and vendors are serviced by the call center 11, but still be related to the users of the call center 11 because the users are interested in the event. For example, an event 24 can be a result of an election, a release of a new computer game, a break-up of a popular celebrity couple, or an upcoming concert of a popular singer.

An event 24 is related to a user if the event 24 affects the user, had affected the user in the past, may affect the user in the future, or if the user is otherwise interested in the event. For example, such users may include customers of a power company who lost power due to a hurricane, or fans of a popular singer that want to buy tickets to a singer's upcoming concert. These users can be either individuals or legal entities, such as corporations. Other types of users affected by an event 24 are possible.

The server 18 is connected to at least one database 22 that can store customer information (not shown) and results 23 of the content monitoring, including any downloaded messages 29, metadata and keywords located in the messages 29, and identified events 24. In a further embodiment, the database 22 can store a list 25 (also referred to an "index" below) of keywords associated with potential events, which can be used to search the social media content to identify an event 24, as further described below. The list 25 can store individual keywords or keywords joined into keyphrases. Other information can also be stored by the database 22.

The automated call center 11 can monitor content to detect trending events 24 related to the call center's 11 customers or other users associated with the call center. FIG. 2 is a flow diagram showing a method 30 for detecting events 24 for use in the automated call center environment 10. Content 28, such as social media messages 29, is monitored (step 31). The social media content 28 can include messages 29, such as updates, tweets, posts, pictures, videos, and instant messages, from users of various social media sites. Other types of content, such as voice recordings and emails, can also be monitored. The monitoring can be limited to particular types of social media, such as particular social networks. In one example, a call center 11 services an online game, and the server 18 can monitor forums and chatrooms associated with the game. Similarly, the server 18 can monitor social media feeds that include posts from particular users or groups of users. The monitoring can be continuous, initiated upon receipt of a command, or occur at predefined intervals. Other ways to perform the monitoring are possible.

Optionally, the messages 29 identified during the monitoring can be filtered (step 32) into one or more subsets, which are used for detecting events, as described in detail infra. The messages 29 can be filtered based on factors such as the time the messages 29 were posted, the type of social media they were posted in, as well as locations or other topics mentioned in the messages 29. For example, a subset can include messages 29 that were posted within a predefined timeframe, with messages 29 posted outside the timeframe being filtered out. The use of the predefined timeframe allows the server 18 to take into account only those messages 29 that are recent enough to remain relevant. The timeframe can include both a single point in time, such as a particular time and date, or a period of time. The timeframe can span any length of time, and can vary depending on the type of potential events involved. For example, for potential events in a fast-paced online game, the timeframe can be minutes or hours. For potential events occurring at a slower pace, such as political events, the timeframe can be as long as weeks or months. Similarly, other types of filters can be used to create the subset. The messages 29 can be filtered based on the type of social media that they were posted in. For example, only messages 29 posted on Facebook® can be filtered into a subset that will be analyzed, with other social media messages being filtered out. Similarly, messages 29 can be filtered based on the topics that they relate to, and only messages 29 that relate to particular topics can be included into a subset. The topics can be associated with particular keywords, n-grams, and entities, and the server 18 can determine that a message 29 concerns the topic if the keyword associated with the topic is included into the message. For example, if a call center 11 is interested only in events occurring in Seattle, only messages 29 that include the word "Seattle" can be filtered into the subset that is used for event detection. In a further embodiment, each topic can further be associated with multiple additional keywords. For example, if the topic is Seattle, keywords or keyphrases that do not include the word Seattle but are nevertheless connected to Seattle, such as the "Space Needle" or another Seattle landmark, are associated with the topic and can be filtered into the subset used for event detection.

The monitored messages 29 can be used to detect potential events (step 33). The monitored messages 29 can be parsed into words and phrases. In one embodiment, the words and phrases in the messages can be compared to an index 25 of keywords that represent the potential events. The keywords in the index 25 can be listed individually or as parts of keyphrases. The index 25 can be stored in the database 22 and accessed for event detection. The messages 29 that include words matching the keywords in the index can be designated as including the keywords representative of the potential events. These messages 29 that share the keywords representative of one of the potential events can be used for detection of that potential event. A potential event can be detected if one or more messages 29 are identified as including keywords representative of that potential event.

Multiple keywords in the index 25 can be representative of the same potential event. For instance, "power outage," "power failure," and "blackout" can all be representative of a loss of electrical power. Thus, messages 29 with words matching multiple keywords in the index can be representative of the same potential event, and can be grouped together for the subsequent analysis described below.

Alternatively, the words and phrases in one of the messages 29 can be compared to words and phrases in other messages, and a potential event can be identified if the words or phrases are shared in the multiple monitored messages. At least some of these messages can be designated as sharing the keywords representative of the potential events. By finding messages that have shared words or phrases, the server 18 can detect potential events regardless of whether the potential events are known to the server 18 in advance. For example, if a potential event has not happened before, such as a popular musician giving a first-ever concert in Seattle, the concert can be detected when multiple messages 29 include the same words associated with the concert.

In a further embodiment, latent semantic analysis can be used to find words and phrases in different messages 29 that are not identical, but have a similar meaning. These messages 29 can also be designated as sharing the keywords representative of the potential events. Similarly, latent semantic analysis can be used to match words in the messages 29 to the keywords in the index described above. Other techniques for detecting messages that include words representative of the same potential events are possible.

Figure 3:
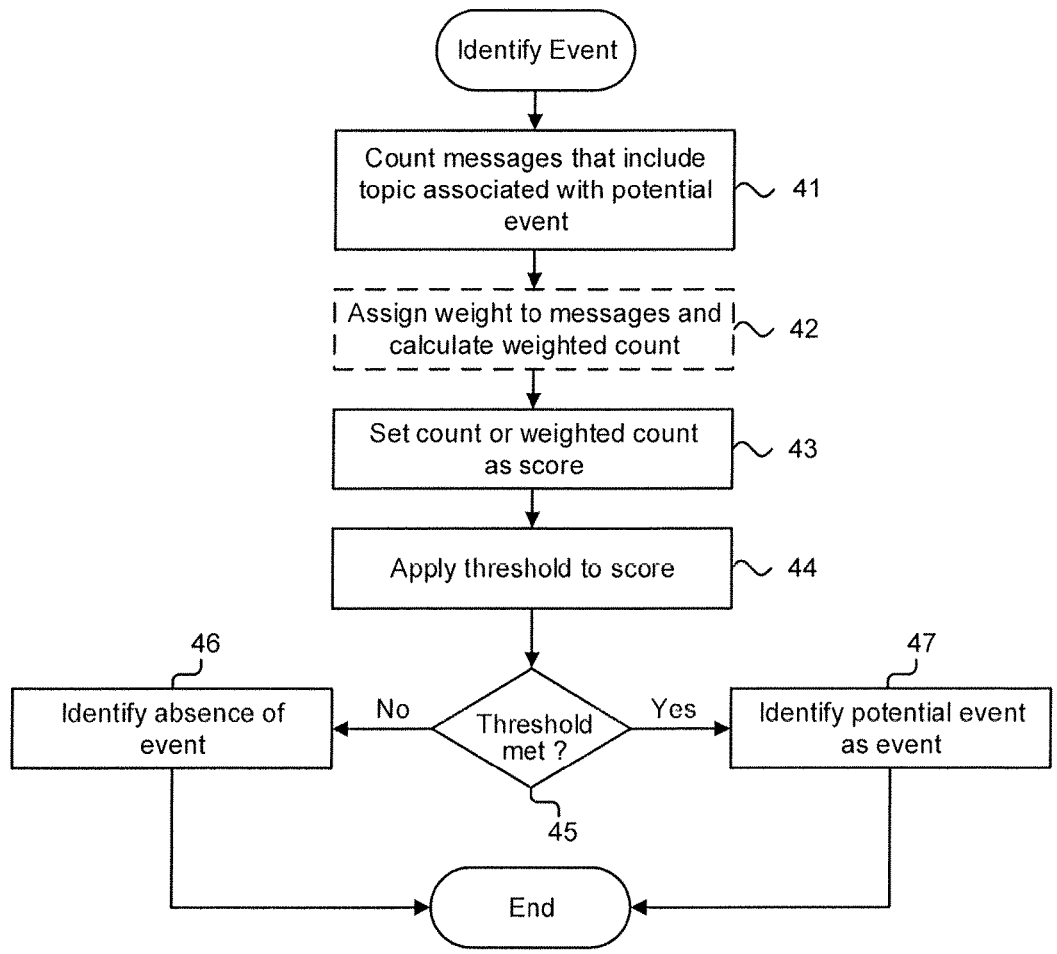
FIG. 3 is a flow diagram showing a routine for identifying an event for use in the method of FIG. 2, in accordance with one embodiment.

One or more of the detected potential events can be identified (step 34) as actual events 24 based on the number of messages 29 that include the keywords representing the potential events or that share common words, as further described below with reference to FIG. 3. Any number of messages 29 can be set as sufficient to identify a potential event as an actual event, and in a further embodiment, a single message coming from a particular user may be sufficient to identify an actual event, as further discussed infra with reference to FIG. 3. The number of messages 29 sufficient for detecting an event can be set automatically or by a user for each specific event.

If presence of one or more actual events 24 is not identified (step 34), the server 18 returns to monitoring social media content (step 31). If one or more actual events 24 are identified (step 34), the server 18 extracts metadata from the messages 29, and if available, from a social media profile of the users who posted the messages (step 35). The metadata can include the content of the message, such as any people, organizations, locations, topics, and dates mentioned in the message. The metadata can also include the time and date the message 29 was posted as well as information posted in the social media profile of the user that posted the message, such as the user's name or location. Referring to the above example of a power outage, metadata 29 such as the time of the outage can be extracted to provide additional information regarding the power outage to the call center and the users related to the power outage. In a further example, if the monitored messages 29 are not filtered, such as based on location, the extracted metadata can include the location of the event 24, which can be used to identify users related to the event 24.

Following the extraction of metadata (step 35), a message regarding an identified event 24 is generated regarding the identified event 24 (step 36). The message can be generated in any medium, including as a video, audio, and a text message. Furthermore, an agent within the call center 11 can directly provide information about the event 24 to a user, as described further below. The message can include the event 24, the extracted metadata, other information that the call center 11 possesses, or information obtained from a third party source, such as news sites or government sites. For example, if the event 24 is the hurricane that caused a power outage, the server 18 can extract metadata from the messages regarding the location and timing of the power outage. The server 18 can also send an inquiry to the power company affected by the hurricane, and request information regarding when the power will be restored. Upon receipt, the information from the power company can be included into the generated message. Similarly, information gathered from other third party sources, such as weather websites, regarding when the hurricane is projected to be over can be included into the generated message. Continuing with the hurricane example, the message can include the information about the power outage caused by the hurricane, what is being done to restore power, and an estimate for when power will be restored.

Once generated, the generated message is provided to at least one user related to the event 24 (step 37). The message can be either automatically provided to the user related to the event 24, or to a call center agent communicating with the user, who passes the information included in the message to the user, as further described with reference to FIG. 4.

Optionally, the call center 11 can contact the customer with a follow-up after the message is delivered (step 38), terminating the method 30. The follow-up can occur through the same medium through which the message is provided or through a different medium. The follow-up can either be entirely automated or involve an agent. During the follow-up, the call center 11 can measure customer satisfaction of the users that received the message about the event 24. Other uses for a follow-up communication are possible.

While not all information posted in social media may be accurate, basing an identification of an event 24 on the number of messages 29 that include the keyword representative of the event 24 reduces the risk of the identification being false, with multiple messages 29 being more likely to have accurate information about the event 24 than a single message. FIG. 3 is a flow diagram showing a routine 40 for identifying an event 24 for use in the method 30 of FIG. 2, in accordance with one embodiment. Initially, the messages 29 sharing the keywords, either individual or joined into keyphrases, representing a potential event are counted (step 41). Optionally, weights can be assigned to the messages and a weighted count of the messages can be calculated (step 42). The weights can be assigned to the messages based on a number of factors, including the keywords identified in the messages 29, and the identities of the authors of the messages 29, including the number of messages 29 a particular author has posted regarding the event 24. For instance, messages with stronger keywords can be more indicative of a particular event 24 and can be assigned more weight. For example, a message 29 that includes the keyword "hurricane" may be assigned more weight than a message that only includes the word "rain" to indicate that an occurrence of a hurricane correlates more with an event such as "bad weather" than an occurrence of rain.

Similarly, messages 29 from one user can be given more weight than messages from another user. For example, a message 29 posted on a singer's Twitter® account regarding that singer's concert in Seattle is more reliable in indicating that the concert will happen and may be weighed more heavily than a message 29 posted by one of the singer's fans.

Also, multiple messages 29 from the same social media user regarding an event 24 can be weighed differently than a single message 29 by a different social media user who posted about the event 24 only once. For example, if a fan of the singer posts the same or similar message 29 about the singer's upcoming concert in Seattle ten times, the weight of the ten messages from this fan may be decreased; the cumulative weight of these messages 29 may be set to equal the weight of a single message by a different social media user who posted about the concert only once. In a further embodiment, messages 29 about an event 24 can be weighed irrespectively of how many times the authors of these messages have posted regarding the event 24.

Once calculated, the count or, if available, the weighted count is set as a score (step 43). A pre-defined threshold can be applied to the score (step 44) to determine whether an actual event 24 has been detected. If the threshold is not satisfied (step 45), an absence of the event 24 is identified (step 46), terminating the routine 40. If the threshold is satisfied (step 45), the potential event is identified as an event 24 (step 47), terminating the routine 40.

Figure 4:
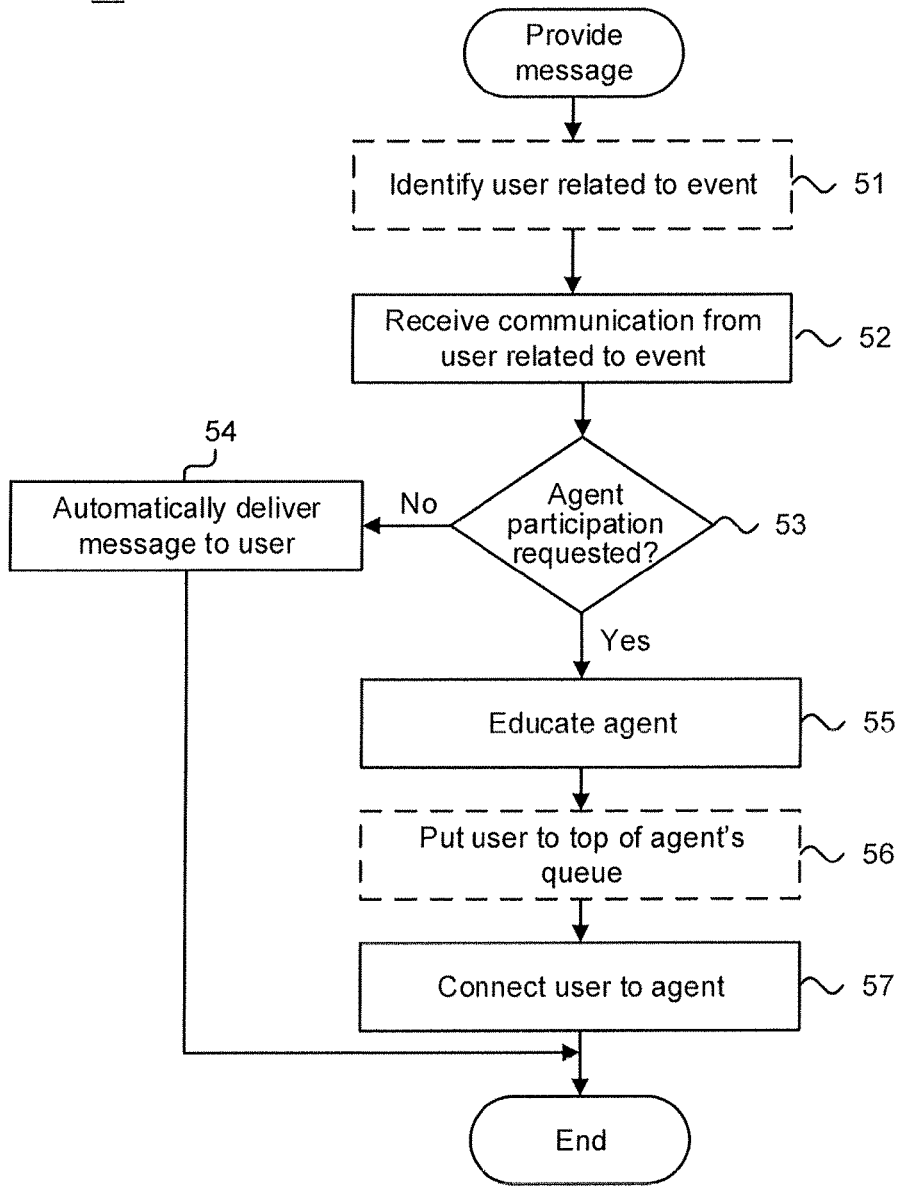
FIG. 4 is a flow diagram showing a routine for providing a message about an event to a user related to the event for use in the method of FIG. 2, in accordance with one embodiment.

Providing a message regarding an event 24 to a user related to that event 24 allows the call center to anticipate the user's questions, and thus save time and increase call center efficiency. FIG. 4 is a flow diagram showing a routine 50 for providing a message about an event 24 to a user related to the event 24 for use in the method 40 of FIG. 2, in accordance with one embodiment. As mentioned above, such users can include users who are or may be affected by the event 24, or are otherwise interested in the event 24. Optionally, one or more users related to the event 24 are identified (step 51). Whether a user is related to the event 24 can be identified based on user input or by analyzing user information, such as location, affiliations, age, organization membership, and other demographic information. For example, when a user communicates with the call center 11, the user can be asked to indicate, such as by pressing a button on the user's phone, whether the user is calling about a particular event. Furthermore, if the server 18 can link a social media user who posted a message about the event 24 to a particular user of the call center 11 by analyzing the information in the user's profile and customer records information, the server 18 can identify the user as related to the event 24. Similarly, if the call center 11 can determine a user's location by analyzing the user's IP address, phone number, or through other techniques, the call center 11 can identify the user as related to an event 24 affecting the geographic location. For some events 24, all of the call center's 11 customers can be determined to be related to the event.

In a further embodiment, if an event 24 occurs repeatedly and a list of related users is known from previous occurrences, further identification of the users is not performed. Similarly, a call center may receive a list of users related to the event from a third party source, and further identification of the users is not performed. Other scenarios for identifying users related to the event are possible.

A communication is received in the call center 11 from one such user related to the event 24 (step 52). The communication can be received in any form, including being through voice communication as well as through as e-mail, chat, text-messaging, videos, or a combination of these or other forms of communication. The communication can also be received before or after the users related to the event 24 are identified (step 51).

If during the communication, the user does not request to speak to a call center agent (step 53), the message is automatically delivered to the user (step 54), terminating the routine 50. For example, when the message is delivered through voice communication, the message can be delivered as a recorded message, or as a part of a script executed under control of an agent as further described in detail in a commonly-assigned U.S. Pat. No. 7,292,689, entitled "System and Method for Providing a Message-Based Communications Infrastructure for Automated Call Center Operation," issued Nov. 6, 2007, the disclosure of which is incorporated by reference. Other ways to deliver the message are possible. In a further embodiment, the generated message is automatically delivered to every user related to the event 24 regardless of whether the user requests agent participation. In an even further embodiment, the message is delivered to the user prior to the customer having an opportunity to request agent participation.

If agent participation is requested by the user related during the communication (step 53), the agent is educated about the event 24 (step 55). Educating the agent can include delivering to the agent the generated message and directing the agent to deliver the content of the generated message to the user. The education can further include presenting the agent with information about the user and giving the agent access to any information regarding the event 24 that was not included into the generated message. Other ways to educate the agent are possible.

Optionally, the user that requested agent participation can be put to the top or near the top of the assigned agent's queue (step 56). Whether the user is put to the top of the agent's queue can depend on factors such as the type of the event 24 involved, whether the user contacted the call center 11 previously about the event 24, and importance of the particular user to the business supported by the call center 11. For example, the server 18 can track whether a user has previously called regarding an event 24, and if the user repeatedly calls regarding the same event 24, such as a recurring glitch in an online game, the user can be put to the top or near the top of the agent's queue. Similarly, if providing the message to the user is urgent, the user can be put to the top of the agent's queue. Other factors influencing putting the customer to the top of the educated agent's queue are possible.

Following the agent being educated (step 55), the user is connected to the agent (step 57), who can deliver the content of the message to the user via voice communication, text message, or another communication technique, and address the user's concerns, terminating the routine 50.

As described above, the message can be delivered to a user when the user initiates the communication with the call center 11. In a further embodiment, the call center 11 can initiate the communication with users related to the event 24. For example, if a chemical spill on a road leading to an airport is identified, the call center 11 can contact the passengers of outgoing flights who are not aware of the spill and provide a message regarding the chemical spill and opportunities to reschedule the passenger's flights. As mentioned above, the message can be provided through a variety of mediums. Upon receiving the message, the users can choose to communicate with the call center. Continuing with the above example, upon receiving a text message regarding the spill, the users can call the call center 11 to reschedule the flight.

While the examples above refer to identifying events 24 based on social media content, the techniques described above can also be applied to other types of content, such as recorded voice messages and e-mails.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for detecting events for use in an automated call center environment, comprising:
   a call center comprising at least one computer processor that is connected to an Internetwork and that is configured to:
      monitor a plurality of social media messages from one or more sources comprising one or more third-party servers that are connected to the Internetwork;
      identify those messages sharing one or more keywords representative of one or more potential events;
      detect the one or more potential events based on the shared keywords;
      identify at least one of the potential events as an event based on the number of messages sharing the keywords representative of that potential event;
      extract metadata regarding the event from the messages sharing the keywords representative of the event;
      obtain information regarding the event from a third party different from the one or more sources of the monitored messages comprising gathering the information from a website associated with the third party via the Internetwork;
      generate a message regarding the event, the generated message comprising the extracted metadata and the information; and
      provide the generated message from the call center to at least one user related to the event.

2. A system according to claim 1, the at least one computer processor further configured to:
   process the messages sharing the keywords, comprising at least one of:
      count the messages sharing the keywords representative of each of the potential events;
      assign a weight to each of the counted messages based on at least one the keywords comprised in the message and an author of the message, and calculating a weighted count based on the assigned weight;
   set one of the count and the weighted count as a score; and
   apply a threshold to the score,
   wherein the at least one potential event is identified as the event upon the score satisfying the threshold.

3. A system according to claim 1, the at least one computer processor further configured to:
compare the monitored messages and identify those messages with common words based on the comparison; and
designate at least some of those messages with the common words as the messages sharing the keywords representative of the potential events.

4. A system according to claim 1, the at least one computer processor further configured to:
maintain an index of keywords;
identify those messages comprising words matching the keywords in the index; and
designate those messages comprising the matching keywords as the messages sharing the keywords representative of the potential events.

5. A system according to claim 1, the at least one computer processor further configured to:
filter the monitored messages based on at least one of a time each of the messages is posted, a topic of each of the messages, and a type of the messages.

6. A system according to claim 1, wherein the metadata comprises at least one of a person, organization, time, and location.

7. A system according to claim 1, the at least one computer processor further configured to:
automatically deliver the generated message to the user.

8. A system according to claim 1, the at least one computer processor further configured to:
educate an agent regarding the event comprising delivering the message to the agent and directing the agent to deliver a content of the generated message to the user.

9. A system according to claim 1, the at least one computer processor further configured to at least one of:
receive at the call center a communication from the user; and
transmit the message to the user at a time comprising at least one of before receiving the communication, while receiving the communication, and after the communication.

10. A system according to claim 9, the at least one computer processor further configured to:
track additional communications received from the user regarding the event;
determine whether the user has repeatedly contacted the call center regarding the event based on the communication and the additional communications; and
assign the user to a top of the agent's queue based upon the determination.

11. A computer-implemented method for detecting events for use in an automated call center environment, comprising the steps of:
monitoring via an Internetwork by at least one server comprised in a call center a plurality of social media messages from one or more sources comprising one or more third party servers;
identifying those messages sharing one or more keywords representative of one or more potential events;
detecting by the at least one server the one or more potential events based on the shared keywords;
identifying by the at least one server at least one of the potential events as an event based on the number of messages sharing the keywords representative of that potential event;
extracting by the at least one server metadata regarding the event from the messages sharing the keywords representative of the event;
obtaining information regarding the event from a third party different from the one or more sources of the monitored messages, comprising gathering the information from a website associated with the third party via the Internetwork;
generating by the at least one server a message regarding the event, the generated message comprising the extracted metadata and the information; and
providing the generated message from the call center to at least one user related to the event,
wherein the steps are performed by a suitably programmed computer.

12. A method according to claim 11, further comprising:
processing the messages sharing the keywords, comprising at least one of:
counting the messages sharing the keywords representative of each of the potential events;
assigning a weight to each of the counted messages based on at least one the keywords comprised in the message and an author of the message, and calculating a weighted count based on the assigned weight;
setting one of the count and the weighted count as a score; and
applying a threshold to the score,
wherein the at least one potential event is identified as the event upon the score satisfying the threshold.

13. A method according to claim 11, further comprising:
comparing the monitored messages and identifying those messages with common words based on the comparison; and
designating at least some of those messages with the common words as the messages sharing the keywords representative of the potential events.

14. A method according to claim 11, further comprising:
maintaining an index of keywords;
identifying those messages comprising words matching the keywords in the index; and
designating the messages comprising the matching keywords as the messages sharing the keywords representative of the potential events.

15. A method according to claim 11, further comprising:
filtering the monitored messages based on at least one of a time each of the messages is posted, a topic of each of the messages, and a type of the messages.

16. A method according to claim 11, wherein the metadata comprises at least one of a person, organization, time, and location.

17. A method according to claim 11, further comprising:
automatically delivering the generated message to the user.

18. A method according to claim 11, further comprising:
educating an agent regarding the event comprising delivering the message to the agent and directing the agent to deliver a content of the generated message to the user.

19. A method according to claim 11, further comprising at least one of:
receiving at the call center a communication from the user;
transmitting the message to the user at a time comprising at least one of before receiving the communication, while receiving the communication, and after the communication.

20. A method according to claim 19, further comprising:
tracking additional communications received from the user regarding the event;

determining whether the user has repeatedly contacted the call center regarding the event based on the communication and the additional communications; and assigning the user to a top of the agent's queue based upon the determination.

* * * * *